United States Patent [19]
Eaton et al.

[11] Patent Number: 4,982,320
[45] Date of Patent: Jan. 1, 1991

[54] ADAPTIVE CONTROL FOR ACCELERATORS

[75] Inventors: Lawrie E. Eaton; Stephen P. Jachim, both of Los Alamos; Eckard F. Natter, Santa Fe, all of N. Mex.

[73] Assignee: The United States of America as represented by the United States Department of Energy, Washington, D.C.

[21] Appl. No.: 263,852

[22] Filed: Oct. 28, 1988

[51] Int. Cl.$^5$ .............................................. G05B 13/02
[52] U.S. Cl. .................................... 364/165; 328/233; 364/194
[58] Field of Search ............... 364/148, 164, 165, 194; 318/561; 328/228, 233, 232; 315/5.41, 5.42; 313/414; 250/396 R

[56] References Cited

U.S. PATENT DOCUMENTS

| | | | |
|---|---|---|---|
| 4,349,869 | 9/1982 | Prett et al. | 364/165 |
| 4,714,988 | 12/1987 | Hiroi et al. | |
| 4,733,149 | 3/1988 | Culberson. | |
| 4,792,870 | 12/1988 | Pinson | 364/165 |

OTHER PUBLICATIONS

"Control of Cavities with High Beam Loading," Boussand, IEEE Trans. Nuclear Science, vol. NS-32, No. 5, 10/85, pp. 1852-1856.
"Progress in Space-Charged Limited Machines: Four Times the Design Intensity in the CERN Proton Synchrotron Booster," Gelato et al., IEEE, CH2387-9/87/0000-1298.
"Computer Control of the Energy Output of a Klystron in the SLC", Jobe et al., CH2387-9/87/0000-0735.
Keith G. Meisner et al., "A New Low Level RF System for the Fermilab Booster," IEEE Trans. on Nuc. Sci., vol. NS-26, No. 3, pp. 4061-4062, (Jun. 1979).

*Primary Examiner*—Joseph Ruggiero
*Attorney, Agent, or Firm*—Ray G. Wilson; Paul D. Gaetjens; William R. Moser

[57] ABSTRACT

An adaptive feedforward control loop is provided to stabilize accelerator beam loading of the radio frequency field in an accelerator cavity during successive pulses of the beam into the cavity. A digital signal processor enables an adaptive algorithm to generate a feedforward error correcting signal functionally determined by the feedback error obtained by a beam pulse loading the cavity after the previous correcting signal was applied to the cavity. Each cavity feedforward correcting signal is successively stored in the digital processor and modified by the feedback error resulting from its application to generate the next feedforward error correcting signal. A feedforward error correcting signal is generated by the digital processor in advance of the beam pulse to enable a composite correcting signal and the beam pulse to arrive concurrently at the cavity.

6 Claims, 5 Drawing Sheets

ADAPTIVE CONTROL FOR ACCELERATORS

This invention is related to feedforward control processes and. more particularly to adaptive feedforward processes for controlling particle accelerators. This invention is the result of a contract with the Department of Energy (Contract No. W-7405-ENG-36).

BACKGROUND OF THE INVENTION

In accelerating a particle beam a beam of particles passes through one or more cavities which are filled with radio frequency (rf) energy. The rf energy is transferred to the particle beam to accelerate the particles. When an accelerating particle beam enters a cavity that is filled with rf energy. a beam-loading effect transfers energy present in the rf field to the beam, causing th particles to accelerate. The beam-loading effect perturbs the amplitude and phase of the cavity rf field with resulting errors in the output beam energy.

Accordingly, rf control circuity is required to keep the phase and amplitude of the rf field constant while the cavity is being filled with rf energy when the beam enters the cavity, and while the beam is present in the cavity. Conventional rf field control is implemented with high speed analog circuitry. However, the limiting factor in the control bandwidth is the pole configuration of the cavity, which is not a static configuration because of thermal and mechanical changes to the cavity during operation of the accelerator. Satisfactory control is obtained during a steady state portion of the beam, but not during the field response from the initial beam transit of the cavity.

Feedforward systems have been used to reduce the errors in the output beam characteristics. However, conventional feedforward systems can only provide for a limited number of perturbing factors. In a typical accelerator rf drive circuit, several sources of loop perturbations exist, such as component nonlinearities, keystone anode voltage droop, and amplitude/phase cross coupling. Such perturbations are not constant but vary with time and component aging. Further, mechanical and thermal changes in the cavity structure cause the characteristic resonance of the cavity to vary. Thus, it is desired to provide an adaptive control loop to monitor the cavity rf field and to provide a time varying corrective signal to accommodate the initial portion of the beam transit through the cavity.

An adaptive feedforward control is provided in accordance with the present invention wherein a control function is successively modified until the cavity response is substantially constant for repetitive beam pulses.

Accordingly, it is an object of the present invention to proVide a feedforWard control loop which is adaptable to changing characteristics of the accelerator components by constantly monitoring the residual error signals.

It is another object of the present invention to provide a feedforward control system using digital signal processing technology.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the process of this invention may comprise a process for correcting rf amplitude and phase errors in an accelerator rf cavity for a pulsed particle beam due to beam loading of the rf cavity. An (N-1) error signal from an (N-1) beam pulse traversing the rf cavity is converted to digital form and functionally combined with a stored (N-1) feedforward correcting signal to generate an Nth feedforward cavity correcting signal. The (N-1) feedforward correcting signal is replaced with the Nth feedforward cavity correcting signal and the Nth feedforward cavity correcting signal is converted to analog form for output from the digital signal processor at a time effective to correct the rf cavity errors for an Nth beam pulse.

In another characterization of the present invention, a process is provided for generating a feedforward signal for correcting system errors arising from a periodic actuation cf the system. An (N-1) error signal from an (N-1) actuation is converted to a digital form and functionally combined with a stored (N-1) feedforward correcting signal to generate an Nth system feedforward correcting signal. The (N-1) feedforward correcting signal is replaced with the Nth system feedforward correcting signal and the Nth feedforward correcting signal is converted to analog form for output from the digital signal processor at a time effective to correct for system errors from an Nth actuation.

In yet another characterization of the present invention an adaptive feedforward control loop is provided for use in a repetitive process. A digital signal processor receives an error signal arising from an (N-1) cycle of the repetitive process and derives an Nth cycle feedforward correction signal from the (N-1) cycle error signal functionally combined with a stored (N-1) cycle correction signal. The control loop is configured to add the Nth cycle feedforward correction signal to an Nth cycle feedback error signal to form an Nth cycle composite correction signal in the loop.

In one other characterization of the present invention an adaptive feedforward control loop is provided to stabilize accelerator beam loading of a radio frequency cavity during successive pulses of the beam into the cavity. A digital signal processor receives an rf cavity error signal arising from an (N-1) pulse of the accelerator beam and derives an Nth beam pulse feedforward correction signal from the (N-1) cavity error signal functionally combined with a stored (N-1) beam pulse correction signal. The control loop is configured to add the Nth beam pulse feedforward correction signal to an Nth cavity feedback error signal to form an Nth beam pulse composite error signal in the loop.

BRIEF DESCRIPTION OF THE DRAWINGS

The accompanying drawings, which are incorporated in and form a part of the specification, illustrate the embodiment of the present invention and, together with the description, serve to explain the principle of the invention. In the drawings.

DETAILED DESCRIPTION OF THE INVENTION

Figure 1:
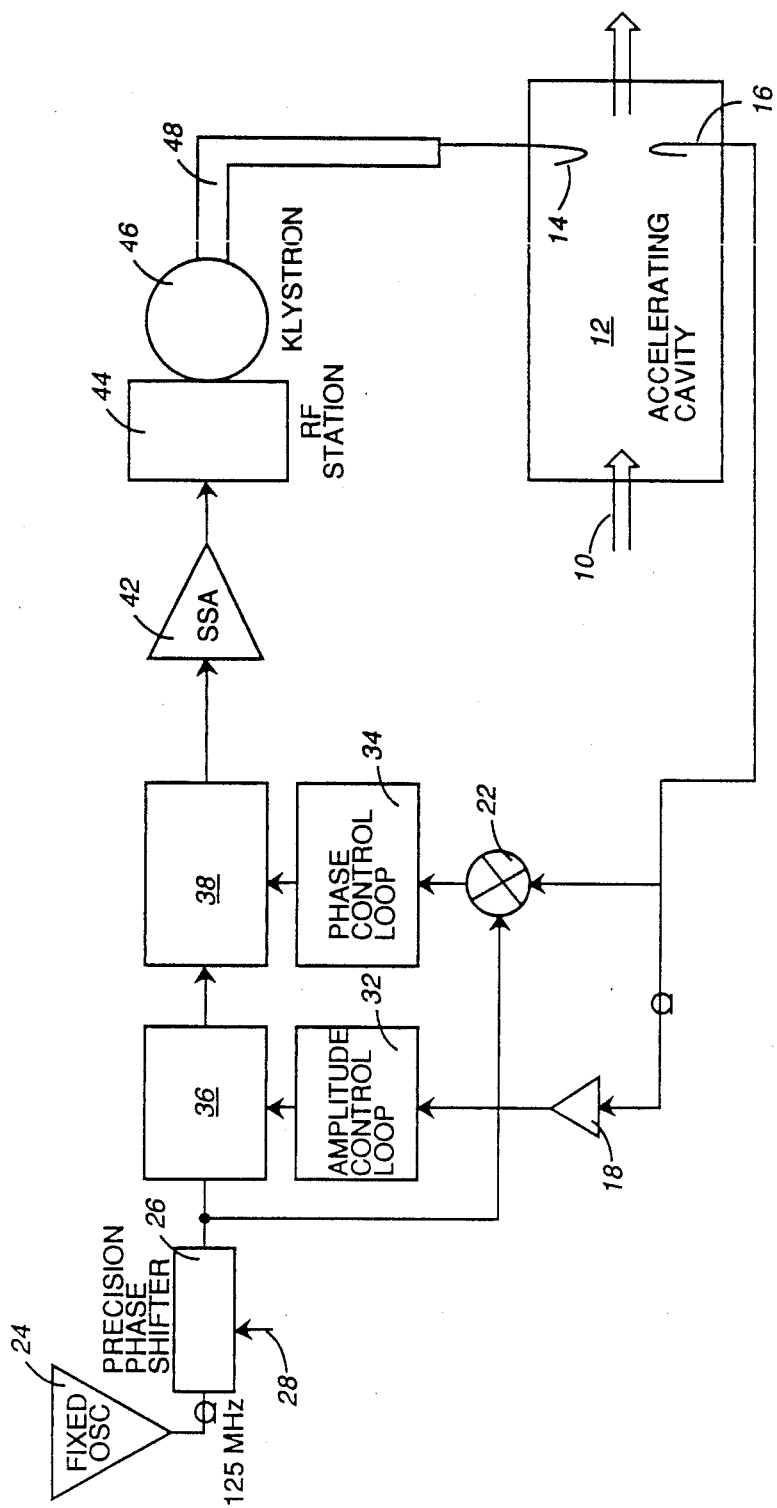
FIG. 1 is a schematic, in block diagram form, of an accelerating cavity and associated control system.

Referring now to FIG. 1, there is shown in block diagram form an accelerating cavity and control loop according to one embodiment of the present invention. particle beam 10 is injected into accelerating cavity 12 to receive energy in the cavity rf field delivered by rf drive loop 14. Cavity 12 may be a radio-frequency quadrupole cavity, a ramped gradient drift-tube linac or a drift-tube linac for increasing the beam energy. Typically, keystone 46 delivers about 1.0 MW of power at 425 MHz. The associated control system preferably provides a field control at ±0.5° in phase and ±0.5 % in amplitude.

The rf field within cavity 12 is sensed by cavity field pickup loop 16. Both the field amplitude and phase are detected and sent to amplitude detector 18 and phase detector 22, respectively. Fixed frequency oscillator 24 provides an rf output frequency, which may typically be 425 MHz. at a known phase through phase shifter 26 responsive to set point phase control 28.

The outputs from amplitude detector 18 and phase detector 22 are provided to amplitude control loop 32 and phase control loop 34, respectively. As hereinafter described, the output signals are compared with system set points and correcting signals are generated. The correcting signals are applied to amplitude controller 36 and phase controller 38 to operate on the rf reference signal output from phase shifter 26. The corrected rf reference signal is amplified by solid-state amplifier 42 and provided to rf input 44 rf klystron 46. Klystron 46 amplifies the rf signal for output through wave guide 48 to rf drive loop 14.

Figure 2:
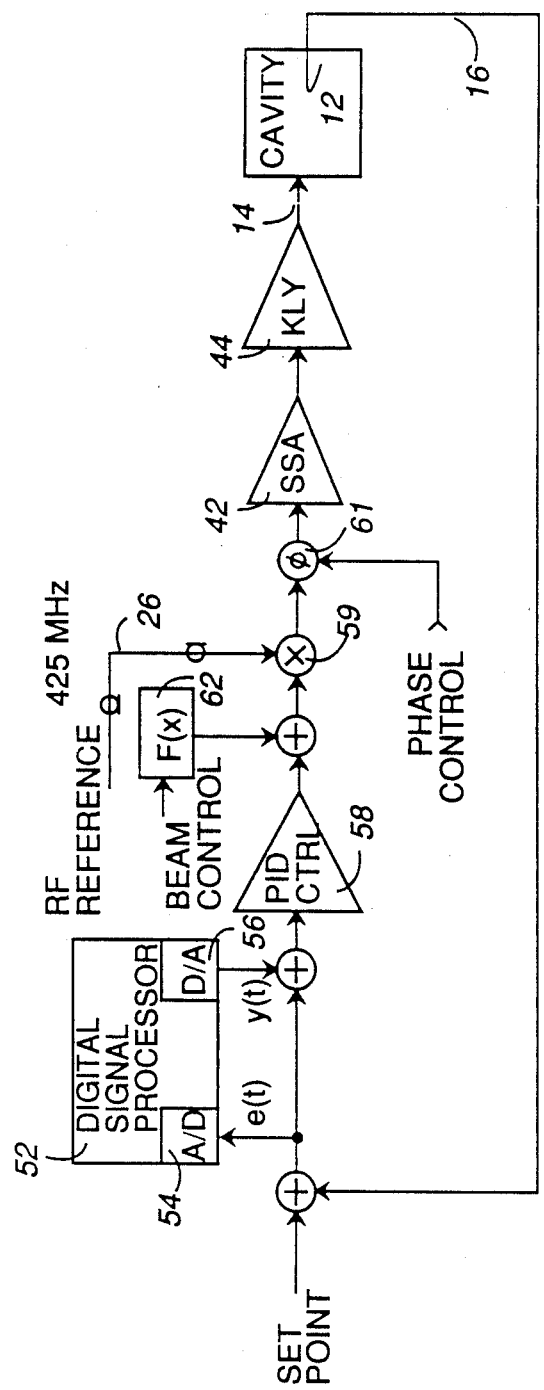
FIG. 2 is a schematic, in block diagram form, of an accelerator control loop with a digital signal processor.

Referring now to FIG. 2 there is shown a control loop with a digital signal processor in accordance with the present invention. The control loop components shown upstream of solid-state amplifier 42 are component parts of amplitude control circuits 32. 36 and phase control circuits 34, 38. Only one set of components for the amplitude control loop is depicted in FIG. 2 since the components are identical for the phase control loop for generating a correcting signal. A real time feedback error signal e(t) is generated from the process variable set point and the output of cavity pickup loop 16. Error signal e(t) is supplied to analog-to-digital (A/D) convertor 54 for digitizing and processing by digital signal processor (DSP) 52. p 52 functionally combines the feedback error signal with a stored feedforward correcting signal and computes a new feedforward correcting signal for use with a subsequent beam pulse. The new feedforward correction signal replaces the previous feedforward correction signal stored in the DSP and is transmitted through D/A convertor 56 to form an analog signal y(t). The feedforward correcting signal y(t) is summed back into the loop with a next feedback error signal e(t) to form a composite correcting signal for processing through to cavity 12.

The composite control signal is output to proportional, integral, and differential (PID) control 58 to further condition the control signal and is summed with beam feedforward control signal 62. Beam feedforward control signal 62 is a predetermined control signal for estimable loop amplitude and phase errors and is not adaptable. The rf reference signal 26 is modified in amplitude by attenuator 59 and in phase by phase shifter 61 with the phase error correction signal from phase control loop 34 (FIG. 1). The corrected rf reference signal is supplied to solid-state amplifier 42 to drive klystron 44 for input 14 to cavity 12.

Figure 3:
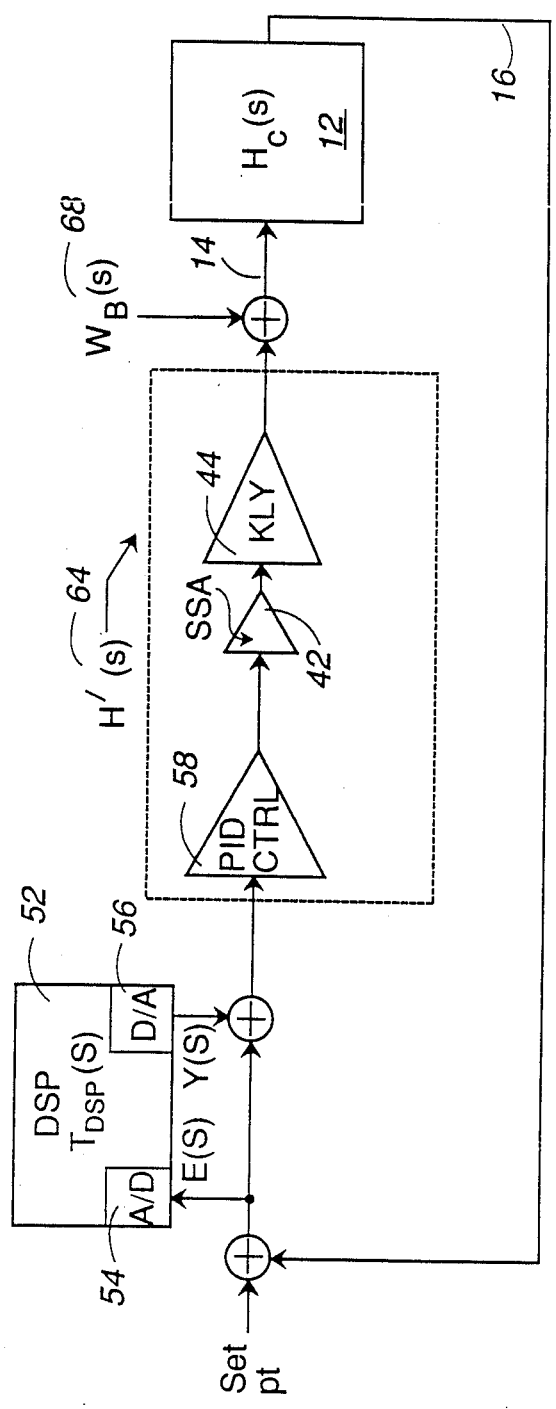
FIG. 3 is a control loop of the system depicted in FIG. 2 in S-plane format.

In FIG. 3 there is depicted the control circuit shown in FIG. 2 in S-plane configuration, i.e., in the Laplace domain. The following functions are depicted:

$H_C(s)$ transfer function of the accelerating cavity 12;

$T_{DSP}(s)$ transfer function for the digital signal processor 52;

E(s) Laplace representation of the feedback error signal;

Y(s) - Laplace representation of the feedforward error correcting signal; and

H'(s) 64 - transfer function of rf signal components, including PID controller 58. solid-state amplifier 42, and klystron 44.

The transfer function $T_{DSP}(s)$ of DSP 52, according to the present invention, can be shown to be the negative inverse of the transfer function of the loop without DSP 52. The beam perturbation $W_B(s)$ 68 generates an overall loop error $$E_B = W_B H_B, \text{ where} \tag{1}$$

$$H_B = H_C/(1 - H_C H'). \tag{2}$$

The loop perturbation generated by the output Y(s) from DSP 52 can be represented as $$E_D = Y H_D, \text{ where} \tag{3}$$

$$H_D = H_C H'/(1 = H_C H'). \tag{4}$$

Then, the output Y(s) which cancels the effect of beam perturbation $W_B(s)$ 68 is $$Y = -E_B/H_D. \tag{5}$$

DSP 52 has to realize a transfer function $T_{DSP}$ to counter beam feedback error $E_B$ and produce feedforward correction signal y. Thus, $$T_{DSP} = Y/E_B = -1/H_D. \tag{6}$$

Y(s) is a leading function, inverted, where a feedforward technique realizes the necessary result. It will also be appreciated that this result is realized by summing the feedforward correcting signal y(s) from DSP 52 with the feedback error signal E(s) to obtain equation (4).

In a second technique for defining feedforward correcting signal y(s), a heuristic analysis of the loop response is used to derive a predistortion function. In the sample time domain, the feedback error signal is e(N.t), where N represents the number of accelerator pulses. i.e., the Nth pulse. The signal e(1,t) is the first sampled feedback error signal and consists of a number of digitized samples of the analog error signal. It should be noted that no feedforward correction signal y(t) is sent out on the first accelerator beam pulse since no feedback error signal is yet available.

One algorithm for determining y(t) is $$y(N,t) = y(N-1, t) + A \cdot e(N-1, t-\tau_1) + B \cdot e(N-1\tau_2). \tag{7}$$

That is, the feedforward correction signal y(t) for the present beam pulse N is the previous feedforward correction signal y(N−1,t). Plus the previous stored feedback error signal e(N−1,t) modified by weighting constants A and B, and temporally adjusted by time delays $\tau_1$ and $\tau_2$. The equation constants A, B, $\tau_1$ and $\tau_2$ were initially selected based on system characteristics and were then varied until the best results were obtained.

Constants A and B act to converge the correcting signals, and the resulting output, in a timely manner without introducing response instabilities. A value less than 1.0 is selected, with a value of 0.3 being used to generate FIG. 5, discussed below. Time delay constants $\tau_1$ and $\tau_2$ correct for signal delay times in the loop. Delay $\tau_1$ is selected to minimize the error with constant B=0. Delay $\tau_2$ is then selected to minimize the error with constant A and $\tau_1$ terms. Additional terms of the form $A_n e(N-1.\tau_n)$ could be provided in equation 7 to further refine the feedforward correcting signal y(N,t).

DSP 52 enables a correcting signal to be generated for a next beam pulse based on the aolual error signal received as a result of the present beam pulse. i.e., to operate in a recursive mode. The sample window for DSP 52 extends over the transient portion of the beam pulse. By weighting the stored error correction function from both amplitude and phase considerations the previous correction function can be modified for use with a next beam pulse. Thus, for the Nth beam pulse, DSp 52 stores the (N-1) feedforward cavity correcting signal arising from the (N-1) beam pulse traversing the rf cavity. A feedforward cavity correcting signal y(N,t) is generated for the next, Nth beam pulse, as functionally related to the stored (N-1) feedforward cavity correcting signal and the feedback error signal from the (N-1) pulse. Feedforward cavity correcting signal y(N,t) replaces y(N-1.t) in DSP 52 storage for use with the feedback error signal arising from the Nth beam pulse.

Figure 4:
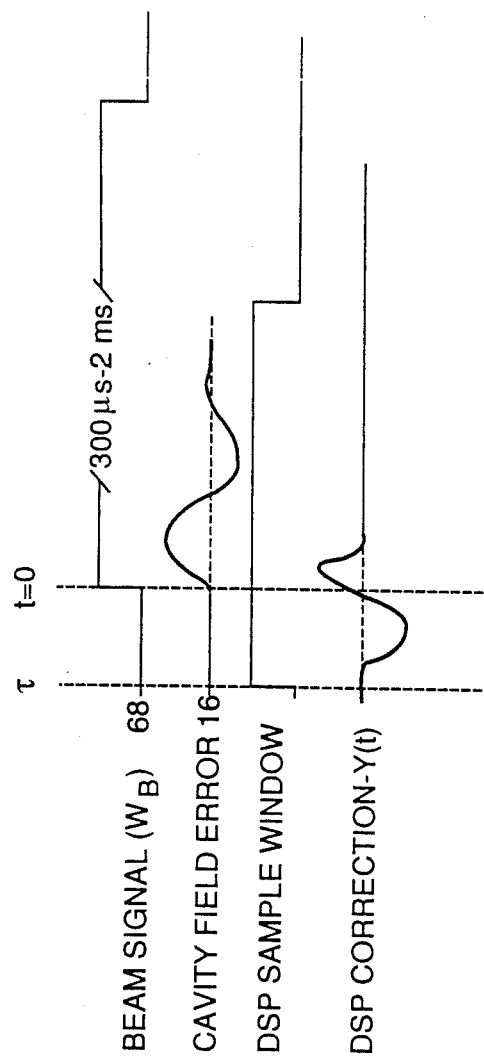
FIG. 4 is a timing diagram for a control signal output.

It will be appreciated that transmission of the correcting signal through the downstream components, e.g., PID control 58, solid-state amplifier 42, and klystron 44, will cause some delay in the arrival of the composite correcting signal at cavity 12. Accordingly, to provide for concurrent application of a correcting signal with the beam loading effect $W_B(s)$ 68. The feedforward cavity correcting signal y(N,t) must be output in advance of beam arrival within cavity 12. In an accelerator application, the beam pulse is periodic, and DSP 52 is programmed to transmit the feedforward correcting signal y(N,t) at a time in advance of the Nth pulse which is effective to arrive at the cavity with the Nth pulse to correct the rf cavity errors. Based on a simulation of accelerator parameters, the timing diagram of FIG. 4 was prepared where the DSP 52 feedforward correcting signal y(t) was generated 250 ns in advance of the beam signal $W_B$ 68.

The system hereinabove described was simulated on a commercially available control system modeling program run on an IBM PC/AT. From the simulation, a model of the system error was obtained. From the simulation model, values for the constants A and $\tau_1$ shown in Equation 7 were initially determined and the system error and correction curves were obtained. Exemplary values of A=0.3 and $\tau_1=250$ ns were selected. As noted above, the values for the constants were modified until an optimum set of response curves was obtained.

Figure 5:
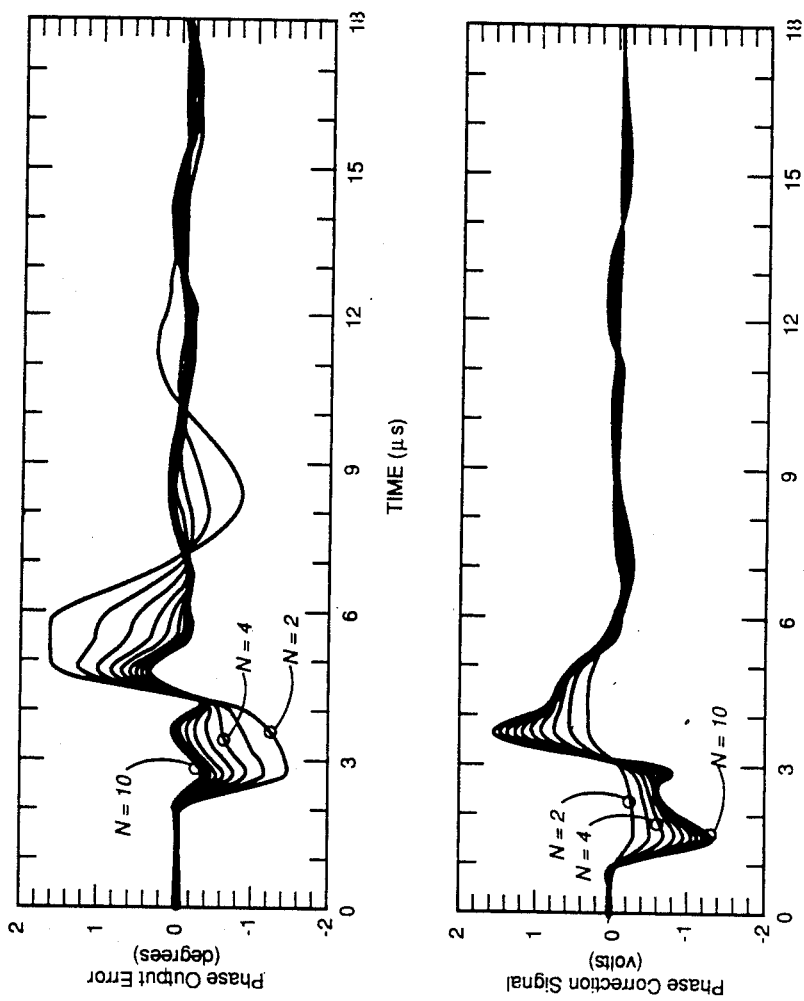
FIG. 5 are output error and correction signal graphs depicting performance of the subject system over a number of cycles.

FIG. 5 depicts the system response curves for the rf phase error and correction signals. It will be noted that after only a relatively few cycles, i.e., 10, the correction signal has substantially stabilized and the output error signal is substantially reduced Some residual errors remain, as shown by the phase output error graph, since nonlinear terms B and $\tau_2$ were not included in the simulation. Accordingly, the simulation has shown that the feedforward control technique according to the present invention will adapt the control algorithm to substantially eliminate residual errors during the initial transient portion of the beam loading and that this error reduction will be obtained after relatively few pulses of the beam through the accelerating cavity being controlled.

The foregoing description of the preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A process for correcting rf amplitude and phase errors in an accelerator rf cavity for a pulsed particle beam due to beam loading of the rf cavity, comprising the steps of:

storing an (N-1) feedforward cavity correcting signal used with an (N-1) beam pulse traversing said rf cavity;

converting to digital form an (N-1) feedback error signal from said (N-1) beam pulse;

digitally generating an N feedforward cavity correcting signal functionally related to said (N-1) feedback error signal according to the relationship $y(N,t) = y(N-1,t) + A \cdot e(N-1,t-\tau_1) + B \cdot e(N-1,t-\tau_2)$ where the beam feedforward correcting signal y(N,t) for the Nth beam pulse is the previous feedforward correction signal y(N-1,t) modified by the previous beam feedback error signal e(N-1,t) with weighting constants A and B and delays $\tau_1$ and $\tau_2$;

replacing said stored (N-1) feedforward cavity correcting signal with said N feedforward cavity correcting signal; and applying said N feedforward cavity correcting signal to said cavity at a time effective to correct said rf cavity errors for an Nth beam pulse.

2. A process for generating a feedforward signal for correcting errors arising from a periodic actuation, comprising the steps of:

storing an (N-1) feedforward correcting signal used with an (Nj-1) actuation;

converting an (N-1) feedback error signal from said (N-1) actuation;

converting an (N-1) feedback error signal from said (Nj-1) actuation to digital form;

digitally generating an Nth feedforward correcting signal functionally related to said (N-1) feedback error signal according to the relationship $y(N,t) = y(N-1,t) + A \cdot e(N-1, t-\tau_1) + B \cdot e(N-1, t-\tau_2)$ where the correcting signal y(N,t0 for the Nth actuation is the previous feedforward correction signal y(N-1,t) modified by the previous error signal e(N-1,t) with weighting constants A nd B and delays $\tau_1$ and $\tau_2$;

replacing said stored (N-1) feedforward correcting signal with said Nth feedforward correcting signal; and applying said Nth feedforward correcting signal to said (H-1) actuation at a time effective to correct for errors from an Nth actuation.

3. An adaptive feedforward control loop for use in a repetitive process, comprising:

a digital signal processor for receiving an error signal arising from an (N-1) cycle of said repetitive process and deriving an Nth cycle feedforward correction signal from said (N-1) feedback cycle error signal, wherein said digital signal processor has a transfer function equal to the negative inverse of the loop transfer function without the digital signal processor;

means for adding said Nth cycle feedforward correction signal to an Nth cycle feedback error signal to form an Nth cycle composite control signal in said loop; and 4. A control loop as described in claim 3, wherein said digital signal processor includes an adaptive algorithm for generating said Nth cycle feedforward correction signal as a function of an (Nj-1) cycle feedforward correction signal and said (N-1) cycle feedback error signal.

5. An adaptive feedforward control loop to stabilize accelerator beam loading of a radio frequency cavity during successive pulses of said beam into said cavity comprising:

a digital signal processor for recieving an rf cavity feedback error signal arising from an (N-1) pulse of said accelerator beam and deriving an Nth beam pulse feedforward correction signal from said (N-1) cavity feedback error signal, wherein said digital signal processor has a transfer function equal to the negative inverse of the loop transfer function without the digital signal processor;

means for adding said Nth beam pulse feedforward correction signal to an Nth cavity feedback error signal to form and Nth beam pulse composite control signal in said loop; and means for applying said composite control signal to said rf cavity.

6. A control loop as described in claim 5, wherein said digital signal processor includes an adaptive algorithm for generating said Nth beam pulse feedforward correction signal as a function of an (N-1) beam pulse feedforward correction signal and said (N-1) cavity feedback error signal.

* * * * *